July 18, 1950 B. POLISENA 2,515,966
ARTICLE GATHERING APPARATUS
Filed June 20, 1944 5 Sheets-Sheet 1
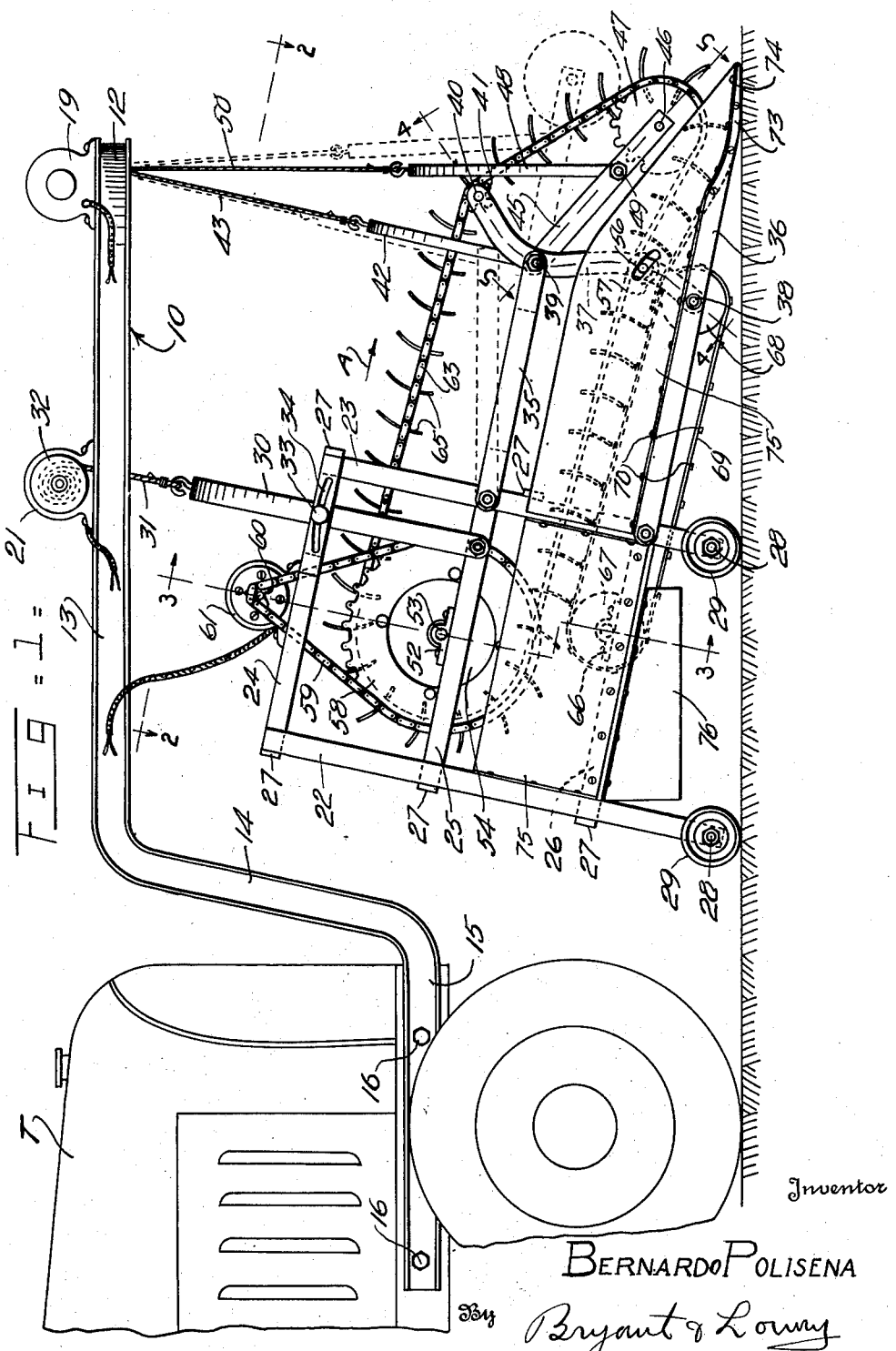
Inventor
BERNARDO POLISENA
By Bryant & Lowry
Attorneys

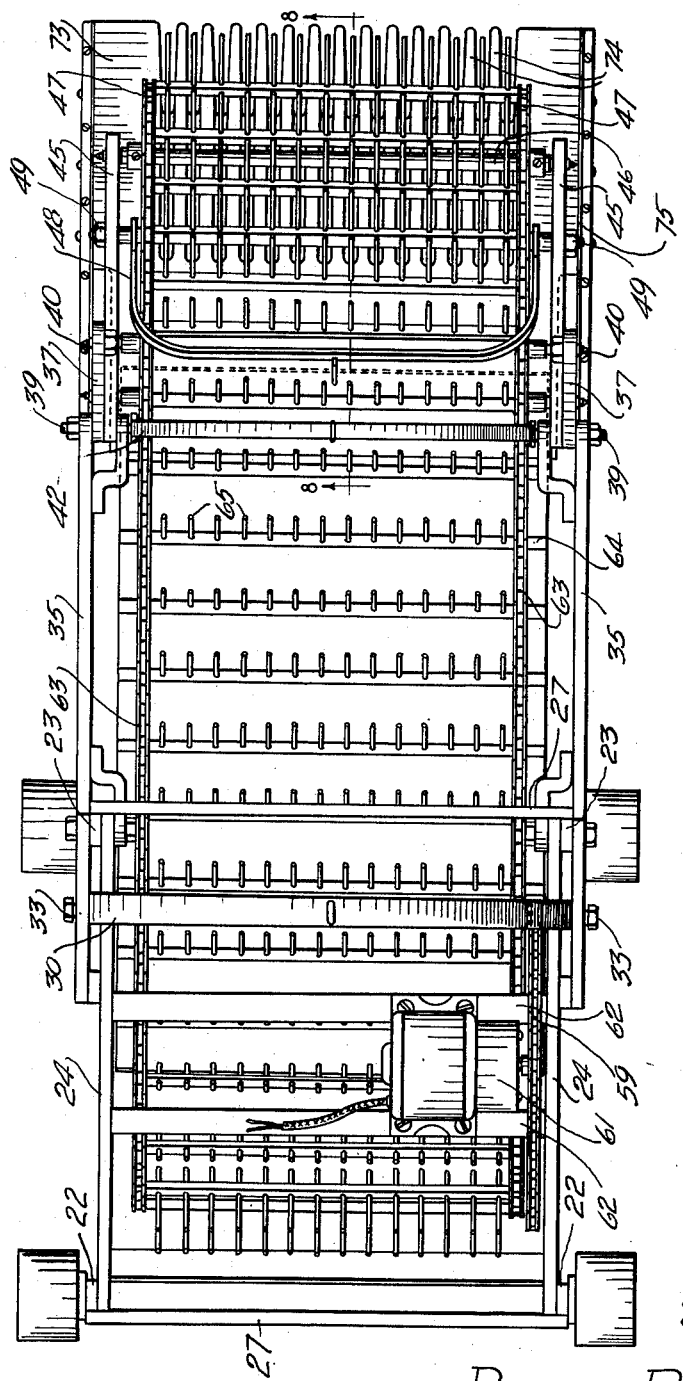

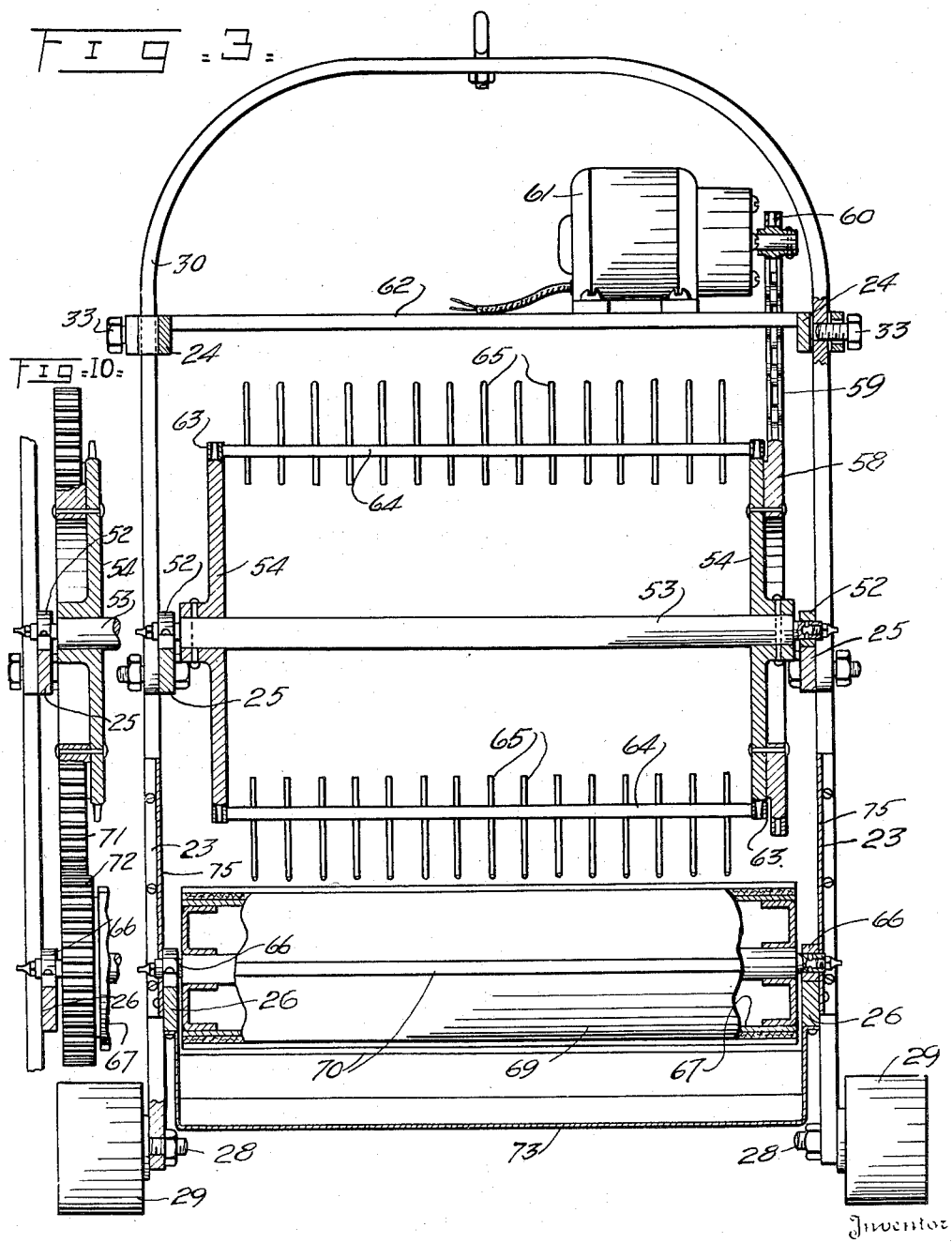

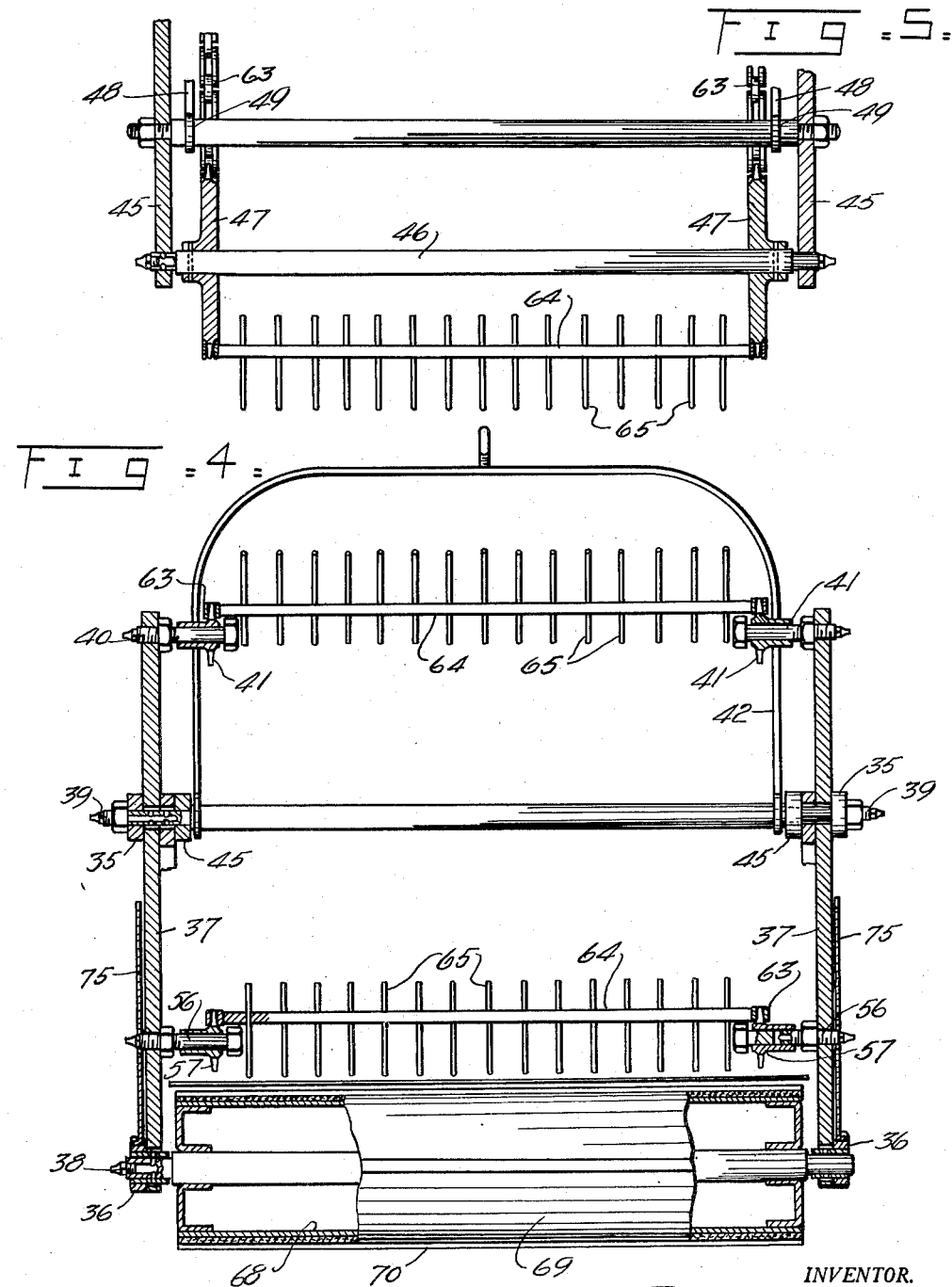

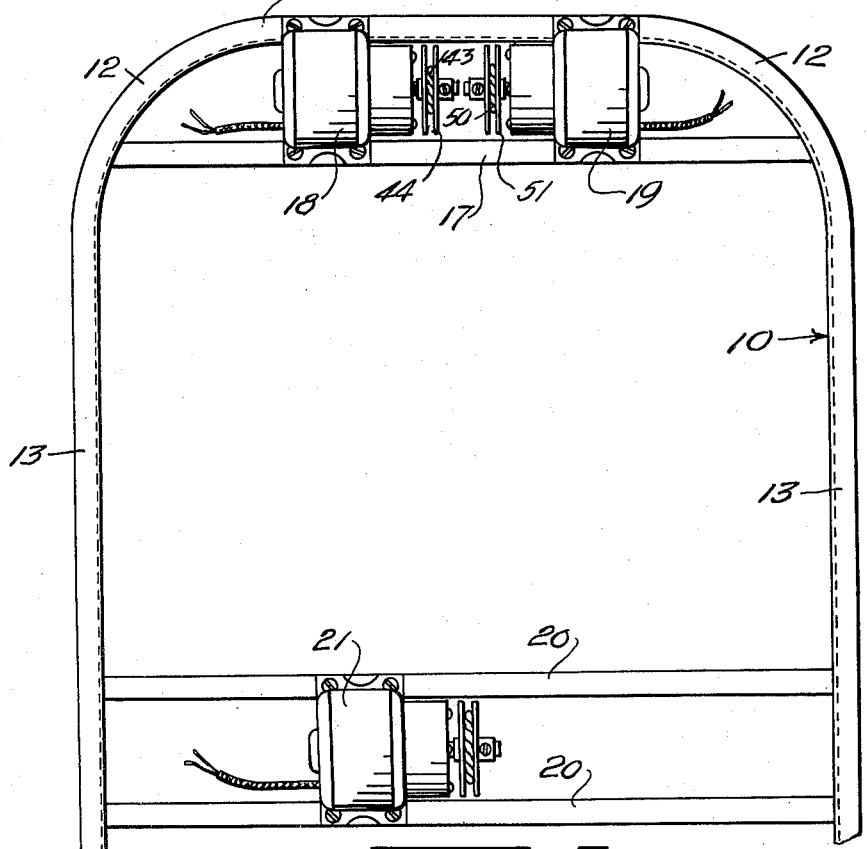
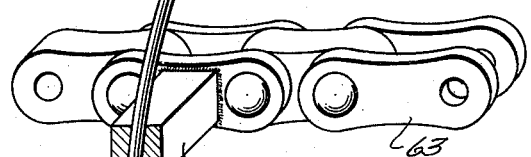
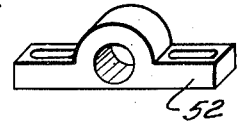
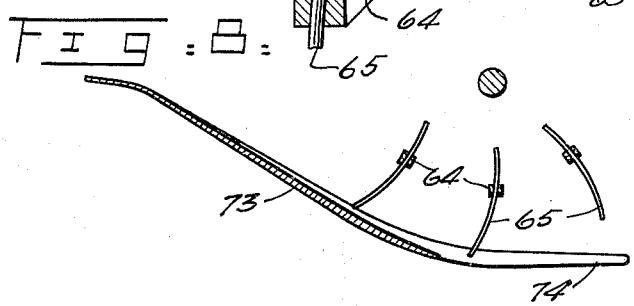

Patented July 18, 1950

2,515,966

UNITED STATES PATENT OFFICE 2,515,966

ARTICLE GATHERING APPARATUS

Bernardo Polisena, Stockton, Calif.

Application June 20, 1944, Serial No. 541,355

4 Claims. (Cl. 56—208)

This invention relates to article gathering apparatus and has as its principal object the provision of a device which may be utilized in the gathering or harvesting of such articles as figs and walnuts or the like from the ground.

A further important object of the invention resides in the provision of such an apparatus which may be utilized for the collection of other articles as, for example, grapes from either the ground or the floors or railway cars or truck for collection in a more readily handled receptacle.

Still another object of the invention resides in the provision of such an apparatus which may be used for harvesting potatoes or digging out Johnson or Bermuda grass.

Still other objects will in part be obvious and in part be pointed out hereinafter.

With the above and other objects in view, the invention consists in general of certain novel details of construction and combinations of parts hereinafter fully described, illustrated in the accompanying drawings and particularly claimed.

In the accompanying drawings, like characters of reference indicate like parts in the several views, and Figure 1 is a side elevation of the improved harvester as applied to the forward end of a vehicle such as a tractor or the like.

Figure 2 is an enlarged top plan view looking in the direction of lines 2—2 of Figure 1.

Figure 3 is an enlarged detail section on line 3—3 of Figure 1.

Figure 4 is an enlarged detail section on line 4—4 of Figure 1.

Figure 5 is an enlarged fragmentary section on line 5—5 of Figure 1, parts being omitted for clarity.

Figure 6 is a top plan view showing only a portion of the main frame and the motors carried thereby.

Figure 7 is a fragmentary perspective showing the construction of certain conveyor chains and flights used herein.

Figure 8 is an enlarged fragmentary view on line 8—8 of Figure 2.

Figure 9 is a detail perspective of one of certain bearings used herein.

In the construction of the invention in the form herein illustrated there is provided a main frame indicated in general at 10. This main frame as shown in Figures 1 to 6, includes an outer frame member extending transversely of the machine at 11 and at each end of the transverse portion the outer frame is curved rearwardly as at 12 and then extends from the rear end of the curve as at 13, the two portions 13 being parallel. At the rear end of the portions 13 this outer frame member is bent downwardly as at 14 and then extends again rearwardly as at 15 to lie on opposite sides of a tractor or the like as indicated at T. Suitable bolts 16 secure this outer frame member to the tractor. By means of this construction the outer frame member is at its forward part offset upwardly from its connection to the tractor and the extent of this upward offsetting may be sufficient to unload grapes from any height of vehicle or may be lowered to gather from the ground or dig into the ground as in harvesting potatoes and eradicating grasses.

As shown in Figure 6, a cross member 17 extends parallel to the portion 11 of the outer frame member and is spaced sufficiently to the rear of such outer frame member to permit the seating on the portion 11 and the cross member 17 of two motors 18 and 19. Well to the rear of the cross member 17 is a pair of cross members 20 spaced to permit mounting thereon of a third motor 21.

Beneath the upwardly offset part of the main frame there is provided a movable frame comprising a pair of rear upright members 22 and a pair of forward upright members 23. The upright members 22 and 23 are connected at the top by longitudinal frame members 24, intermediate their heights by longitudinal frame members 25 and adjacent their lower ends as by longitudinal frame members 26. The frame members 22 and 23 at each side of the machine are connected by transverse members 27 so that there is thus formed a rigid secondary frame. The frame members 23 are somewhat shorter than the frame members 22 and on the lower ends of these frame members 22 and 23 are stub axles 28 upon which are mounted ground wheels 29.

Thus this auxiliary or movable frame inclines forwardly when the ground wheels rest upon the ground. Pivoted to the frame members 25 are the legs of a yoke 30 which is connected by a rope 31 to a winding drum 32 driven by the motor 21. Bolts 33 pass through arcuate slots 34 in the frame members 24 and are screwed into the yoke 30 so that the yoke may, if desired, be clamped against swinging movement by tightening up the bolts 33 or may be left loose for swinging movement by loosening the bolts 33.

Pivoted to the auxiliary frame at the forward ends of the members 25 is a pair of arms 35 and similarly a pair of arms 36 is pivoted to the auxiliary frame at the forward ends of the members 26. The members 36 are considerably longer than the members 35 and at each side of the machine an upright member 37 has its lower end pivoted on a shaft 38 which is journaled in the members 36 intermediate their ends. The members 37 are likewise pivoted on shafts 39 which extend between the forward ends of the members 35.

The members 37 extend upwardly and forwardly from the shaft 39 and carry at their upper ends alined stub shafts 40, best shown in Figure 4, and on the shafts 40 are carried chain sprockets 41. A yoke 42 has its legs carried by the shaft 39 and this yoke is connected by a rope 43 to a winding drum 44 actuated by the motor 18. Pivoted on the shaft 39 is a pair of arms 45 which have their forward ends connected by shaft 46 which carries a pair of chain sprockets 47. A yoke 48 has its legs pivoted to the arms 45 as at 49 and this yoke is connected by a rope 50 to a winding drum 51 driven by the motor 19.

Mounted on the frame members 25 are bearings 52 wherein is journaled a shaft 53 supporting a pair of spaced chain sprockets 54. The members 37 are provided adjacent their lower ends with stub shafts 56 whereon are mounted chain sprockets 57. Riveted to one of the chain sprockets 54 is a chain sprocket 58 which is connected by a chain 59 with a sprocket 60 mounted on the shaft of a motor 61 supported on members 62 extending transversely between the members 24. Chains 63 are trained around the sprockets 54 and 47 and over the sprockets 40 and 57, the arrangement being best seen in Figure 1.

The motor 61 is arranged to drive the chain in the direction indicated by the arrow A. Spaced lengths of the two chains 63 are connected by flights 64 through which extend spaced and curved teeth 65.

On the frame members 26 is mounted a pair of bearings 66 wherein is journaled the shaft of a belt drum 67, a similar belt drum 68 being carried by the shaft 38. A belt 69 having rib-like flights 70 is trained over the drums 67 and 68. The teeth 65, in their rearward movement, travel along with the upper run of the belt 69 and in order to provide for maintaining uniformity of linear motion a gear 71 may be carried by one of the sprockets 54 and may mesh with a gear 72 carried by a drum 67, the gear ratio being such as to secure the proper uniformity of speed between the belt 69 and the adjacent ends of the teeth 65.

Between the forward end portions of the members 36 extends a lifter plate or shovel 73 which terminates forwardly in a series of spaced fingers 74 so arranged that the teeth 65 may, as they pass around the sprockets 55, engage in the spaces between the teeth 74. In order to prevent the load on the conveyor from being lost at the sides of the machine these sides are provided with plates 75 and at the rear end of the lower conveyor or belt 69 there is provided a receptacle 76 into which the material from the belt 69 is discharged.

In the operation of the device it may be driven to the locality of the articles to be gathered with the movable frame and its adjuncts raised. This is accomplished by operating the motors 18, 19 and 21 to cause their respective winding drums to wind up on the lifting ropes 31, 43 and 50. On arrival at the scene of operations it is generally preferable to lower the device until the ground wheels 29 rest on the ground. If material is to be gathered very close to or on the ground the motors 18 and 19 are operated to relax the ropes 43 and 50 until the parts assume the position shown in full lines in Figure 1. However, as shown by the dotted lines in Figure 1, either the entire structure forward of the auxiliary frame may be raised by drawing upon the rope 43 or the forward sprockets and consequently the forward ends of the chains 63 may be raised by drawing upon the rope 50. When in raised position the apparatus may obviously be operated to remove articles from the floor of a truck or railway car to be collected in receptacle 76.

When gathered by the fingers 65 the material is carried rearwardly up the apron or shovel 73 and delivered onto the upper run of the belt 69, the material on this run moving backwardly just as the teeth 55 move backwardly so that it is not dragged over the belt 69 but travels uniformly with it. At the rear end the material is delivered to the receptacle 76 from which it may be removed as desired.

What is claimed, is:

1. An article gathering apparatus including a transverse main frame adapted to be attached to the forward portion of a motor vehicle and extend forwardly therefrom, a plurality of motors carried by said main frame, winding drums operable by said motors, a secondary frame carried beneath said main frame, connections between the forward end of said secondary frame and certain of said winding drums, and connections between the rear end of said secondary frame and others of said winding drums whereby selective raising or lowering of either end of said secondary frame may be effected and article gathering means carried by said secondary frame.

2. The construction of claim 1 wherein the article gathering means includes forwardly extending spaced fingers, a belt having rib-like flights thereon rearwardly of said fingers, sprockets carried by said secondary frame on opposite sides thereof, chains operable by said sprockets, flights between said chains, teeth carried by said last mentioned flights and motor means for driving said belt and said sprockets.

3. The structure of claim 2 wherein gearing is provided between said sprockets and the drive means for said belt to provide synchronous motion therebetween.

4. The structure of claim 3 wherein said teeth extend to the forward extremity of said apparatus between said fingers.

BERNARDO POLISENA.

REFERENCES CITED

The following references are of record in the file of this patent:

UNITED STATES PATENTS

| Number | Name | Date |
|---|---|---|
| 880,887 | Holman | Mar. 3, 1908 |
| 897,844 | Nettleship | Sept. 1, 1908 |
| 1,153,968 | Speck | Sept. 21, 1915 |
| 1,226,573 | Nelson | May 15, 1917 |
| 1,572,025 | Maglathlin | Feb. 9, 1926 |
| 1,907,467 | Tervo et al. | May 9, 1933 |
| 1,928,236 | Thoen | Sept. 26, 1933 |
| 2,073,653 | Rust et al. | Mar. 16, 1937 |
| 2,208,128 | Holbrook et al. | July 16, 1940 |
| 2,320,953 | Shenstone | July 1, 1943 |